(12) United States Patent
Xia et al.

(10) Patent No.: US 10,728,854 B2
(45) Date of Patent: Jul. 28, 2020

(54) CELL HANDOVER METHOD AND TERMINAL DEVICE

(71) Applicant: Huawei Technologies Co., Ltd., Shenzhen (CN)

(72) Inventors: Shiying Xia, Shanghai (CN); Hongbo Lan, Shanghai (CN); Changfeng Zhou, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/472,686

(22) PCT Filed: Dec. 30, 2016

(86) PCT No.: PCT/CN2016/113532
§ 371 (c)(1),
(2) Date: Jun. 21, 2019

(87) PCT Pub. No.: WO2018/120032
PCT Pub. Date: Jul. 5, 2018

(65) Prior Publication Data
US 2019/0373552 A1 Dec. 5, 2019

(51) Int. Cl.
*H04W 36/08* (2009.01)
*H04W 52/02* (2009.01)
(Continued)

(52) U.S. Cl.
CPC . *H04W 52/0251* (2013.01); *H04W 36/00837* (2018.08); *H04W 36/08* (2013.01); *H04W 36/18* (2013.01); *H04W 76/27* (2018.02)

(58) Field of Classification Search
CPC ..... H04W 76/27; H04W 76/19; H04W 76/15; H04W 76/30; H04W 36/005;
(Continued)

(56) References Cited

U.S. PATENT DOCUMENTS 9,125,208 B2   9/2015   Suzuki et al.
9,288,720 B2   3/2016   Nukala et al.
(Continued)

FOREIGN PATENT DOCUMENTS

CN   101568158 A   10/2009
CN   102088756 A   6/2011
(Continued)

OTHER PUBLICATIONS

Machine Translation and Abstract of Chinese Publication No. CN101568158, Oct. 28, 2009, 18 pages.
(Continued)

*Primary Examiner* — Liton Miah
(74) *Attorney, Agent, or Firm* — Conley Rose, P.C.

(57) ABSTRACT

A terminal device may determine that the terminal device camps on a first cell and is located within a coverage area of a second cell. The terminal device determines that no data service has been received within a preset-duration. The terminal device further determines that a radio resource control (RRC) connection is not released when no data service is received within the preset duration. The terminal device performs a hand over from the first cell to the second cell upon determining that the RRC connection is not released.

20 Claims, 7 Drawing Sheets

When determining that no data service is transmitted within preset duration, a terminal device determines whether an RRC connection is released — S101

When determining that the RRC connection is not released, the terminal device hands over from a first cell to a second cell — S102

(51) Int. Cl.
*H04W 76/27* (2018.01)
*H04W 36/00* (2009.01)
*H04W 36/18* (2009.01)

(58) Field of Classification Search
CPC ..... H04W 76/25; H04W 36/30; H04W 36/36; H04W 36/38; H04W 48/20; H04W 76/10; H04W 36/0058; H04W 36/0069; H04W 36/0077; H04W 36/0088; H04W 36/08; H04W 36/24
See application file for complete search history.

(56) References Cited

U.S. PATENT DOCUMENTS

| | | | |
|---|---|---|---|
| 2012/0315913 A1 | 12/2012 | Yang et al. | |
| 2016/0014839 A1* | 1/2016 | Liu | H04W 76/18 370/329 |
| 2016/0249402 A1* | 8/2016 | Zhang | H04W 68/08 |
| 2016/0262067 A1 | 9/2016 | Hara | |

FOREIGN PATENT DOCUMENTS

| | | |
|---|---|---|
| CN | 102111856 A | 6/2011 |
| CN | 102196518 A | 9/2011 |
| CN | 103747492 A | 4/2014 |
| CN | 105657861 A | 6/2016 |
| EP | 2645804 A1 | 10/2013 |
| WO | 2012131568 A2 | 10/2012 |

OTHER PUBLICATIONS

Machine Translation and Abstract of Chinese Publication No. CN102196518, Sep. 21, 2011, 15 pages.
Foreign Communication From a Counterpart Application, PCT Application No. PCT/CN2016/113532, English Translation of International Search Report dated Sep. 1, 2017, 2 pages.
Foreign Communication From a Counterpart Application, PCT Application No. PCT/CN2016/113532, English Translation of Written Opinion dated Sep. 1, 2017, 3 pages.
Machine Translation and Abstract of Chinese Publication No. CN102111856, Jun. 29, 2011, 22 pages.
Machine Translation and Abstract of Chinese Publication No. CN103747492, Apr. 23, 2014, 16 pages.
Machine Translation and Abstract of Chinese Publication No. CN105657861, Jun. 8, 2016, 35 pages.
Foreign Communication From a Counterpart Application, Chinese Application No. 201680077654.1, Chinese Office Action dated Dec. 18, 2019, 6 pages.
Foreign Communication From a Counterpart Application, European Application No. 16925280.6, Extended European Search Report dated Nov. 20, 2019, 10 pages.

* cited by examiner

CELL HANDOVER METHOD AND TERMINAL DEVICE

CROSS-REFERENCE TO RELATED APPLICATIONS

This application is a U.S. National Stage of International Application No. PCT/CN2016/113532, filed on Dec. 30, 2016, which is hereby incorporated by reference in its entirety.

TECHNICAL FIELD

Embodiments of the present invention relate to communications technologies, and in particular, to a cell handover method and a terminal device.

BACKGROUND

Currently, with continuous development of communications technologies, a 4G communications network based on a Long Term Evolution (Long Term Evolution, LTE for short) technology emerges. The 4G communications network has advantages such as a fast network speed, good communication quality, and always in service, and brings good experience to a user.

However, in a process in which the user uses a terminal device in the 4G communications network, if a configuration of a cell in which the terminal device is located is abnormal, power consumption of the terminal device increases, and consequently a battery life of the terminal device is relatively short and cannot meet a requirement of the user in actual use.

SUMMARY

Embodiments of the present invention provide a cell handover method and a terminal device, to resolve a prior-art technical problem that power consumption of the terminal device increases and a battery life of the terminal device is relatively short because a configuration of a cell in which the terminal device is located is abnormal.

A first aspect of the embodiments of the present invention provides a cell handover method. A terminal device currently camps on a first cell, the terminal device is further currently located in a coverage area of a second cell, and the method includes: when determining that no data service is transmitted within preset duration, determining, by the terminal device, whether a radio resource control RRC connection is released; and when determining that the RRC connection is not released, handing over, by the terminal device, from the first cell to the second cell.

According to the cell handover method provided in the first aspect, when no data service is transmitted within the preset duration, the terminal device that camps on the first cell may determine whether the RRC connection to a base station to which the first cell belongs is released. Further, when determining that the RRC connection is not released, the terminal device may determine that a configuration of the first cell is abnormal, and hand over from the first cell with the abnormal configuration to the second cell. This avoids a problem that power consumption of the terminal device increases because the terminal device maintains the RRC connection to the base station of the first cell, reduces the power consumption of the terminal device, and prolongs a battery life of the terminal device.

Optionally, the handing over, by the terminal device, from the first cell to the second cell includes: determining, by the terminal device, whether the terminal device is currently in a screen-off state; and when the terminal device is currently in a screen-off state, handing over, by the terminal device, from the first cell to the second cell.

According to the cell handover method provided in this possible implementation, when the terminal device is currently in a screen-off state, the terminal device may directly hand over from the first cell with the abnormal configuration to the second cell. This reduces the power consumption of the terminal device while ensuring user experience.

For example, the handing over, by the terminal device, from the first cell to the second cell includes: handing over, by the terminal device, from the first cell to the second cell, and recording an identifier of the first cell.

According to the cell handover method provided in this possible implementation, when completing a cell handover procedure, the terminal device may further record the identifier of the first cell, so that when the terminal device moves to coverage areas of the first cell and the second cell again, the terminal device can determine, by using the recorded identifier of the first cell, that the configuration of the first cell is abnormal, to avoid accessing the first cell, and prevent the first cell with the abnormal configuration from affecting the power consumption of the terminal device. This further reduces the power consumption of the terminal device, and further prolongs the battery life of the terminal device.

Optionally, the handing over, by the terminal device, from the first cell to the second cell includes:
determining, by the terminal device, whether the terminal device is currently in a screen-off state;
when the terminal device is currently in a screen-on state, recording, by the terminal device, an identifier of the first cell;
when the terminal device enters a screen-off state from a screen-on state, determining, by the terminal device, whether an identifier of a cell on which the terminal device currently camps is the recorded identifier of the first cell; and
when the identifier of the cell on which the terminal device currently camps is the recorded identifier of the first cell, handing over, by the terminal device, from the first cell to the second cell.

According to the cell handover method provided in this possible implementation, when the terminal device is currently in a screen-on state, the terminal device may first record the identifier of the first cell. After the terminal device enters a screen-off state, the terminal device determines whether the identifier of the cell on which the terminal device currently camps is the same as the recorded identifier of the first cell, and when the identifier of the cell on which the terminal device currently camps is the same as the recorded identifier of the first cell, the terminal device performs the cell handover procedure, to hand over from the first cell with the abnormal configuration to the second cell. This avoids bringing unstable network experience to a user, and reduces the power consumption of the terminal device while ensuring user experience.

For example, the first cell and the second cell are cells in an intra-RAT communications network.

For example, the first cell and the second cell are cells in inter-RAT communications networks.

A second aspect of the embodiments of the present invention provides a terminal device. The terminal device currently camps on a first cell, the terminal device is further currently located in a coverage area of a second cell, and the terminal device includes: a determining module, configured to: when determining that no data service is transmitted within preset duration, determine whether a radio resource control RRC connection is released; and a handover module, configured to: when it is determined that the RRC connection is not released, hand over the terminal device from the first cell to the second cell.

Optionally, the handover module includes: a first determining unit, configured to determine whether the terminal device is currently in a screen-off state; and a first handover unit, specifically configured to: when the terminal device is currently in a screen-off state, hand over the terminal device from the first cell to the second cell.

For example, the first handover unit is specifically configured to: hand over the terminal device from the first cell to the second cell, and record an identifier of the first cell.

Optionally, the handover module includes: a second determining unit, configured to determine whether the terminal device is currently in a screen-off state; a recording unit, configured to: when the terminal device is currently in a screen-on state, record an identifier of the first cell; a third determining unit, configured to: when the terminal device enters a screen-off state from a screen-on state, determine whether an identifier of a cell on which the terminal device currently camps is the recorded identifier of the first cell; and a second handover unit, configured to: when the identifier of the cell on which the terminal device currently camps is the recorded identifier of the first cell, hand over the terminal device from the first cell to the second cell.

For example, the first cell and the second cell are cells in an intra-RAT communications network.

For example, the first cell and the second cell are cells in inter-RAT communications networks. For beneficial effects of the terminal device provided in the second aspect and the possible implementations of the second aspect, refer to the beneficial effects brought by the first aspect and the possible implementations of the first aspect. Details are not described herein again.

A third aspect of the embodiments of the present invention provides a terminal device. The terminal device currently camps on a first cell, the terminal device is further currently located in a coverage area of a second cell, and the terminal device includes a processor and a memory. The memory is configured to store computer-executable program code, and the program code includes an instruction; and when the processor executes the instruction, the instruction enables the terminal device to perform the cell handover method in the first aspect and the possible implementations of the first aspect. For beneficial effects of the third aspect, refer to the beneficial effects brought by the first aspect and the possible implementations of the first aspect. Details are not described herein again.

A fourth aspect of the embodiments of the present invention provides a terminal device, including at least one processing element (or chip) for performing the method in the first aspect.

A fifth aspect of the embodiments of the present invention provides a program. The program is used to perform the method in the first aspect when being executed by a processor.

A sixth aspect of the embodiments of the present invention provides a program product, for example, a computer-readable storage medium, including the program in the fifth aspect.

According to the cell handover method and the terminal device provided in the embodiments of the present invention, when no data service is transmitted within the preset duration, the terminal device that camps on the first cell may determine whether the RRC connection to the base station to which the first cell belongs is released. Further, when determining that the RRC connection is not released, the terminal device may determine that the configuration of the first cell is abnormal, and hand over from the first cell with the abnormal configuration to the second cell. This avoids a problem that the power consumption of the terminal device increases because the terminal device maintains the RRC connection to the base station of the first cell, reduces the power consumption of the terminal device, and prolongs the battery life of the terminal device.

DESCRIPTION OF EMBODIMENTS

Figure 1:
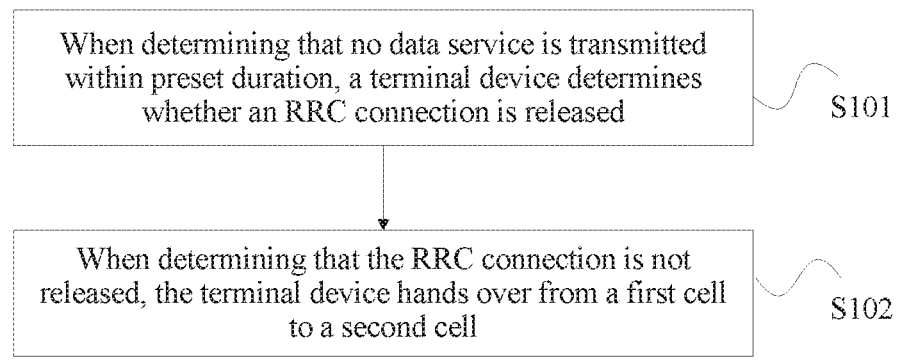
FIG. 1 is a schematic flowchart of a cell handover method according to an embodiment of the present invention.

A terminal device in the embodiments of the present invention may be a device that provides a user with voice and/or data connectivity, a handheld device with a radio connection function, or another processing device connected to a wireless modem. A wireless terminal may communicate with one or more core networks by using a radio access network (Radio Access Network, RAN). The wireless terminal may be a mobile terminal such as a mobile phone (also referred to as a "cellular" phone) and a computer with a mobile terminal, for example, may be a portable, pocket-sized, handheld, computer built-in, or in-vehicle mobile apparatus, which exchanges language and/or data with the radio access network. For example, the wireless terminal may be a device such as a personal communication service (PCS, Personal Communication Service) phone, a cordless telephone set, a Session Initiation Protocol (SIP) phone, a wireless local loop (WLL, Wireless Local Loop) station, or a personal digital assistant (PDA, Personal Digital Assistant). The wireless terminal may also be referred to as a system, a subscriber unit (Subscriber Unit), a subscriber station (Subscriber Station), a mobile station (Mobile Station), a mobile console (Mobile), a remote station (Remote Station), an access point (Access Point), a remote terminal (Remote Terminal), an access terminal (Access Terminal), a user terminal (User Terminal), a user agent (User Agent), a user device (User Device), or user equipment (User Equipment).

In the prior art, when a user uses a terminal device in a 4G communications network, the terminal device may perform data transmission with a base station by using a radio resource control (Radio Resource Control, RRC for short) connection that is established to the base station to which a cell belongs. After the user stops using the terminal device, no data is transmitted between the terminal device and the base station. Therefore, the base station may send an RRC connection release request to the terminal device, so that the terminal device can release the RRC connection, to avoid increasing power consumption of the terminal device because the terminal device maintains the RRC connection to the base station.

In this case, if a configuration of a cell in which the terminal device is located is abnormal, for example, a parameter related to an RRC disconnection time in a configuration parameter of the cell is abnormal, after the user stops using the terminal device, the base station to which the cell belongs does not send the RRC connection release request to the terminal device, so that when no data is transmitted between the base station and the terminal device, the RRC connection is still maintained between the base station and the terminal device. The terminal device maintains the RRC connection to the base station by using a modem of the terminal device. To be specific, when no data is transmitted between the base station and the terminal device, the RRC connection is still maintained between the modem of the terminal device and the base station, and therefore the modem needs to continuously work. This increases the power consumption of the terminal device, and shortens a battery life of the terminal device.

In view of the foregoing case, the embodiments of the present invention provide a cell handover method, so that if the terminal device cannot release the RRC connection after no data is transmitted, the terminal device can hand over to another cell with a normal configuration, to avoid a case in which when no data is transmitted between the terminal device and the base station, the RRC connection is still maintained between the terminal device and the base station. This can further reduce the power consumption of the terminal device, and prolong the battery life of the terminal device. Therefore, the cell handover method provided in the embodiments of the present invention aims to resolve a prior-art technical problem that the power consumption of the terminal device increases and the battery life is relatively short because the configuration of the cell in which the terminal device is located is abnormal.

It should be noted that the cell handover method provided in the embodiments of the present invention includes but is not limited to the application scenario of the terminal device in the 4G communications network. A person skilled in the art may understand that the cell handover method provided in the embodiments of the present invention may be used in all scenarios in which the power consumption of the terminal device increases because the configuration of the cell on which the terminal device camps is abnormal. The following application document is described by using the 4G communications network as an example.

The following describes technical solutions in this application in detail with reference to specific embodiments. The following specific embodiments may be mutually combined, and same or similar concepts or processes may not be repeatedly described in some embodiments.

FIG. 1 is a schematic flowchart of a cell handover method according to an embodiment of the present invention. In this embodiment, a terminal device currently camps on a first cell and is located in a coverage area of one or more second cells. To be specific, the terminal device may transmit a data service by establishing an RRC connection to a base station to which the first cell belongs. This embodiment includes a specific process in which when determining that the RRC connection is not released, the terminal device hands over from the first cell to a second cell. As shown in FIG. 1, the method may include the following steps:

S101. When determining that no data service is transmitted within preset duration, the terminal device determines whether the RRC connection is released.

S102. When determining that the RRC connection is not released, the terminal device hands over from the first cell to the second cell.

Specifically, the preset duration may be specifically determined based on a manner in which a base station to which a cell with a normal configuration belongs sends an RRC connection release request. For example, if no data service is transmitted between the base station to which the cell with the normal configuration belongs and the terminal device within 10 seconds, the base station sends the RRC connection release request to the terminal device, and the preset duration may be greater than or equal to 10 seconds. If no data service is transmitted between the base station to which the cell with the normal configuration belongs and the terminal device within one minute, the base station sends the RRC connection release request to the terminal device, and the preset duration may be greater than or equal to one minute.

In this case, after a user stops using the terminal device, the terminal device may determine, based on whether data sent by the base station to which the first cell belongs is received within the preset duration and whether data is sent within the preset duration to the base station to which the first cell belongs, whether a data service is transmitted within the preset duration. If the terminal device does not receive, within the preset duration, the data sent by the base station to which the first cell belongs, and does not send, within the preset duration, the data to the base station to Which the first cell belongs, the terminal device may determine that no data service is transmitted within the preset duration. Then, the terminal device may further determine, based on Whether the terminal device receives, within the preset duration, the RRC connection release request sent by the base station to which the first cell belongs, whether the RRC connection between the terminal device and the base station to which the first cell belongs is released.

When the RRC connection release request sent by the base station to which the first cell belongs is received within the preset duration, it indicates that an RRC connection release procedure is normally performed between the terminal device and the base station to which the first cell belongs, in other words, the configuration of the first cell is normal. Therefore, the terminal device may determine that the RRC connection between the terminal device and the base station to which the first cell belongs is released. In this case, the terminal device does not encounter a case in which "when no data is transmitted between the terminal device and the base station to which the first cell belongs, the RRC connection is still maintained between the terminal device and the base station to which the first cell belongs", and further, power consumption of the terminal device does not increase due to this case. Therefore, in this case, the terminal device may continue to camp on the first cell and does not take any measure.

When the RRC connection release request sent by the base station to which the first cell belongs is not received within the preset duration, it indicates that the configuration of the first cell is abnormal, and the RRC connection release procedure is not performed within the preset duration between the terminal device and the base station to which the first cell belongs. Therefore, the terminal device may determine that the RRC connection between the terminal device and the base station to which the first cell belongs is not released. In this case, no data is transmitted between the terminal device and the base station to which the first cell belongs. However, the RRC connection is still maintained between the terminal device and the base station to which the first cell belongs. To be specific, the RRC connection is still maintained between a modem of the terminal device and the base station to which the first cell belongs, and therefore the modem of the terminal needs to continuously work. This increases the power consumption of the terminal device, and shortens a battery life of the terminal device. In this case, the terminal device may hand over from the first cell with the abnormal configuration to the second cell. If the second cell is a cell with a normal configuration, after the terminal device hands over to the second cell, when no data is transmitted between the terminal device and a base station to which the second cell belongs, an RRC connection may be normally released between the terminal device and the base station to which the second cell belongs, to avoid increasing the power consumption of the terminal device and further prolong the battery life the terminal device.

An implementation in which the terminal device hands over from the first cell to the second cell is not limited in this embodiment. Optionally, if the second cell is also a cell in a 4G communications network, the first cell and the second cell are cells in an intra-RAT communications network. When determining that the RRC connection is not released, the terminal device may send a pseudo measurement report generated by the terminal device to the base station to which the first cell belongs. The pseudo measurement report is used to indicate to the base station to which the first cell belongs that a channel condition is relatively poor when the terminal device currently camps on the first cell. In this way, after receiving the measurement report, the base station to which the first cell belongs may determine, based on the measurement report, that the terminal device currently meets a cell handover condition, and instruct, by sending a cell handover instruction to the terminal device, the terminal device to hand over from the first cell to the second cell, so that the terminal device can hand over from the first cell to the second cell according to the cell handover instruction. In this case, if the terminal device is currently located in the coverage area of the one or more second cells, the base station may select a suitable second cell for the terminal device by performing an existing cell handover procedure, and instruct the terminal device to hand over from the first cell to the second cell.

Optionally, if the second cell is a cell in a communications network corresponding to a communications standard earlier than a communications standard corresponding to the 4G communications network, for example, a 3G communications network, or a 2G communications network, the first cell and the second cell are cells in inter-RAT communications networks. The 3G communications network is used as an example. When determining that the RRC connection is not released, the terminal device may further send, to the base station to which the first cell belongs, a network capability change request indicating that the terminal device does not support the 4G communications network, so that a communications system in which the 4G communications network is located and a communications system in which the 3G communications network is located can allow the terminal device to re-search for the 3G communications network and camp on the second cell in the 3G communications network, and the terminal device hands over from the first cell to the second cell.

According to the cell handover method provided in this embodiment of the present invention, when no data service is transmitted within the preset duration, the terminal device that camps on the first cell may determine whether the RRC connection to the base station to which the first cell belongs is released. Further, when determining that the RRC connection is not released, the terminal device may determine that the configuration of the first cell is abnormal, and hand over from the first cell with the abnormal configuration to the second cell. This avoids a problem that the power consumption of the terminal device increases because the terminal device maintains the RRC connection to the base station of the first cell, reduces the power consumption of the terminal device, and prolongs the battery life of the terminal device.

Further, based on the foregoing embodiment, before handing over from the first cell to the second cell, the terminal device may further determine whether the terminal device is currently in a screen-off state. For how the terminal device determines whether the terminal device is currently in a screen-off state, refer to the prior art.

Case 1: The terminal device is currently in a screen-off state.

Specifically, if the terminal device determines that the RRC connection is not released, the terminal device is currently in a screen-off state, indicating that the user does not use the terminal device currently. In this case, if the terminal device performs a cell handover procedure, the user is not affected. Therefore, the terminal device may directly hand over from the first cell with the abnormal configuration to the second cell. This reduces the power consumption of the terminal device while ensuring user experience.

Further, when completing the cell handover procedure, the terminal device may further record an identifier of the first cell, so that when the terminal device moves to coverage areas of the first cell and the second cell again, the terminal device may determine, by using the recorded identifier of the first cell, that the configuration of the first cell is abnormal, to avoid accessing the first cell, and prevent the first cell with the abnormal configuration from affecting the power consumption of the terminal device. This further reduces the power consumption of the terminal device, and further prolongs the battery life of the terminal device. Optionally, in another implementation of this embodiment of the present invention, the identifier of the first cell recorded by the terminal device may correspond to preset duration. After accumulated duration of recording the identifier of the first cell reaches the preset duration, the terminal device may delete the identifier of the first cell, to lift a restriction that the terminal device cannot camp on the first cell. In this manner, after the configuration of the first cell is restored to normal, the terminal device may still access the first cell after moving to the first cell, to ensure normal communication of the terminal device. The preset duration may be specifically determined based on a restoration time of the first cell with the abnormal configuration.

Case 2: The terminal device is currently in a screen-on state.

Specifically, if the terminal device determines that the RRC connection is not released, the terminal device is currently in a screen-on state, indicating that the user currently still uses the terminal device. In this case, if the terminal device performs the cell handover procedure, unstable network experience is brought to the user. Therefore, when the terminal device is currently in a screen-on state, the terminal device may first record the identifier of the first cell, and after the terminal device enters a screen-off state from a screen-on state, compare an identifier of a cell on which the terminal device currently camps with the recorded identifier of the first cell, to determine whether the identifier of the cell on Which the terminal device currently camps is the recorded identifier of the first cell. The identifier of the first cell described herein may be any identifier that can uniquely identify the first cell, for example, an ID of the first cell.

When the identifier of the cell on which the terminal device currently camps is the same as the recorded identifier of the first cell, it indicates that the terminal device certainly still camps on the first cell with the abnormal configuration. Therefore, the terminal device may perform the cell handover procedure, to hand over from the first cell with the abnormal configuration to the second cell. In this case, the terminal device is in a screen-off state. Therefore, the terminal device performs the cell handover procedure, and unstable network experience is not brought to the user. This reduces the power consumption of the terminal device while ensuring user experience.

When the identifier of the cell on which the terminal device currently camps is different from the recorded identifier of the first cell, it indicates that the terminal device certainly does not camp on the first cell with the abnormal configuration. Therefore, the terminal device may not perform the cell handover procedure. In this case, the terminal device may determine, by performing the implementation of the foregoing embodiment, whether a configuration of a current camping cell is abnormal. For an implementation and an implementation principle, refer to the foregoing embodiment. Details are not described herein again.

Further, when the terminal device is currently in a screen-on state, the terminal device records the identifier of the first cell. Therefore, when the terminal device is located in the coverage areas of the first cell and the second cell again, the terminal device may determine, by using the recorded identifier of the first cell, that the configuration of the first cell is abnormal, to avoid accessing the first cell, and prevent the first cell with the abnormal configuration from affecting the power consumption of the terminal device. This further reduces the power consumption of the terminal device, and further prolongs the battery life of the terminal device. Optionally, in another implementation of this embodiment of the present invention, the identifier of the first cell recorded by the terminal device may correspond to preset duration. After accumulated duration of recording the identifier of the first cell reaches the preset duration, the terminal device may delete the identifier of the first cell, to lift a restriction that the terminal device cannot camp on the first cell. In this manner, after the configuration of the first cell is restored to normal, the terminal device may still access the first cell after moving to the first cell, to ensure normal communication of the terminal device. The preset duration may be specifically determined based on a restoration time of the first cell with the abnormal configuration.

According to the cell handover method provided in this embodiment of the present invention, when no data service is transmitted within the preset duration, the terminal device that camps on the first cell may determine whether the RRC connection to the base station to which the first cell belongs is released. Further, when determining that the RRC connection is not released, the terminal device may determine that the configuration of the first cell is abnormal, and hand over from the first cell with the abnormal configuration to the second cell. This avoids a problem that the power consumption of the terminal device increases because the terminal device maintains the RRC connection to the base station of the first cell, reduces the power consumption of the terminal device, and prolongs the battery life of the terminal device.

Figure 2A:
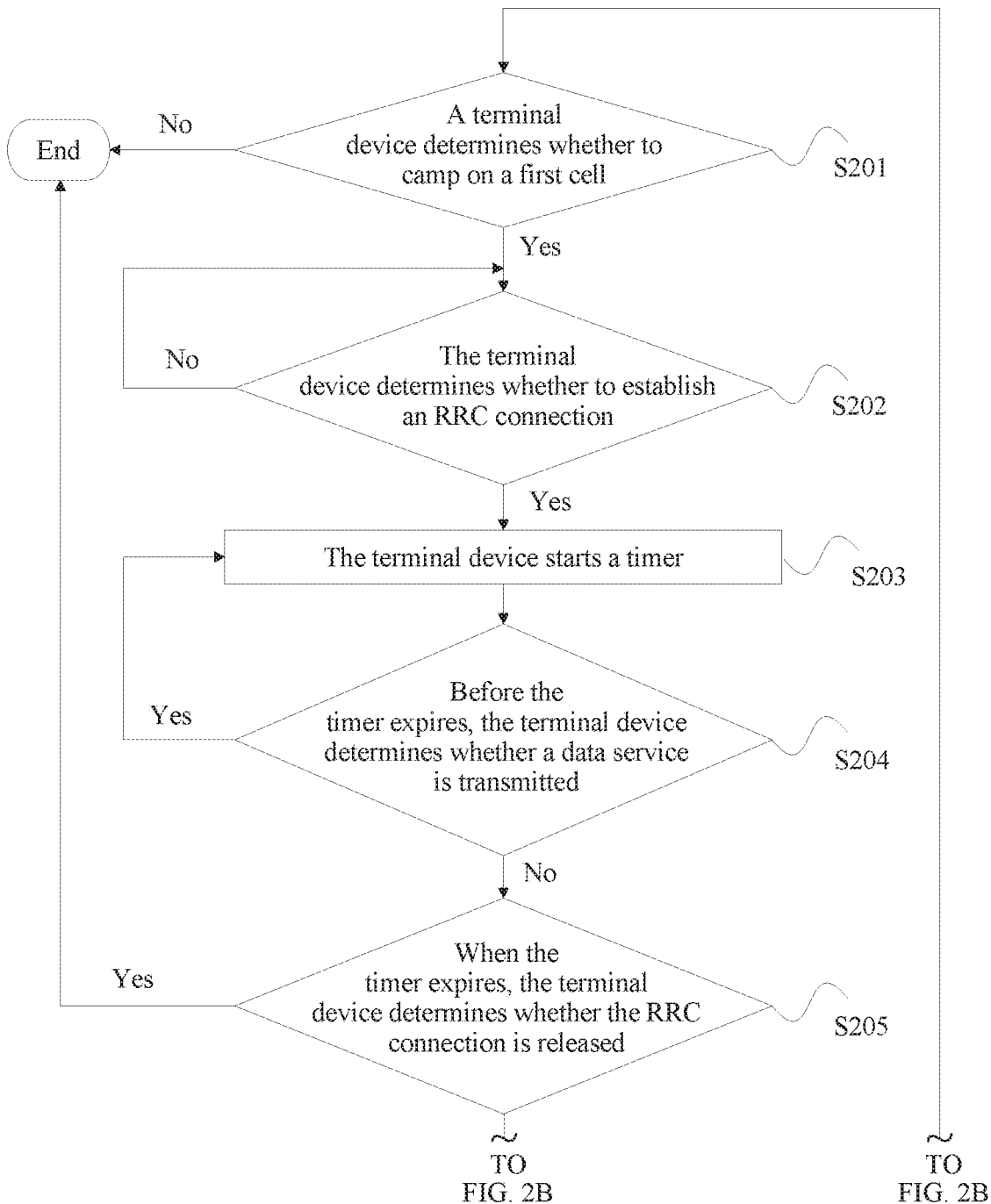
FIG. 2A and FIG. 2B are a schematic flowchart of another cell handover method according to an embodiment of the present invention.
Figure 2B:
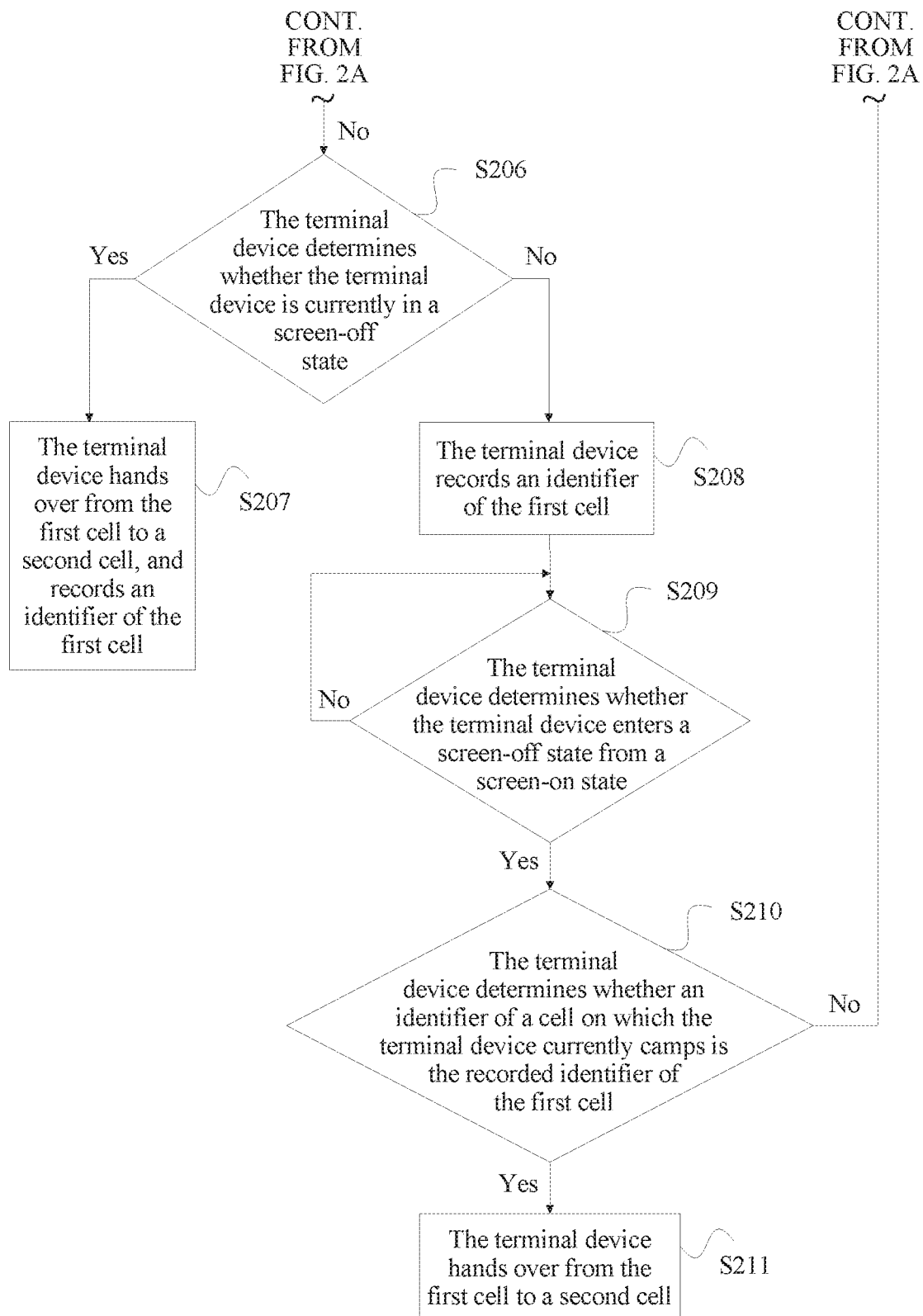

The following describes in detail the cell handover method provided in this embodiment of the present invention by using a specific example. In this example, a tinier may be disposed in the terminal device to implement the foregoing preset duration, in other words, duration corresponding to the timer is the preset duration described above. FIG. 2A and FIG. 2B are a schematic flowchart of another cell handover method according to an embodiment of the present invention. As shown in FIG. 2A and FIG. 2B, the method includes the following steps.

S201. A terminal device determines whether to camp on a first cell. If the terminal device determines to camp on the first cell, S202 is performed; or if the terminal device determines not to camp on the first cell, a procedure ends.

Specifically, the terminal device may determine, based on whether a response message that is used to indicate that the terminal device successfully camps and that is sent by a base station to which the first cell belongs is received, whether the terminal device camps on the first cell. When the terminal device receives the response message, it indicates that the terminal device camps on the first cell, and S202 is performed. When the terminal device does not receive the response message, it indicates that the terminal device does not camp on the first cell, and the procedure ends.

S202. The terminal device determines whether to establish an RRC connection. If the terminal device determines to establish the RRC connection, S203 is performed; or if the terminal device determines not to establish the RRC connection, S202 continues to be performed.

Specifically, after determining to camp on the first cell, the terminal device may further determine whether the RRC connection is established between the terminal device and the base station to which the first cell belongs.

In specific implementation, the terminal device may determine, based on whether a response message indicating that the RRC connection is successfully established or a response message indicating that an RRC connection is successfully reconfigured is received, whether the RRC connection is established between the terminal device and the base station to which the first cell belongs. When the terminal device receives any one of the foregoing response messages, it indicates that the RRC connection is established between the terminal device and the base station to which the first cell belongs, and S203 is performed. When the terminal device does not receive any one of the foregoing response messages, it indicates that the RRC connection is not established between the terminal device and the base station to which the first cell belongs, and S202 continues to be performed.

S203, The terminal device starts a timer.

Specifically, after the terminal device determines that the RRC connection to the base station to which the first cell belongs is established, the terminal device may start the timer to monitor, by using the timer, whether a configuration of the first cell is abnormal. Duration of the timer is the preset duration described in the foregoing embodiment.

S204. Before the timer expires, the terminal device determines whether a data service is transmitted. If the terminal device determines that a data service is transmitted, S203 is performed; or if the terminal device determines that no data service is transmitted, S205 is performed.

Specifically, before the timer expires, the terminal device may determine in real time, based on whether data sent by the base station to which the first cell belongs is received and whether data is sent to the base station to which the first cell belongs, whether a data service is transmitted.

If the terminal device always has no data service to transmit before the timer expires, when the timer expires, the terminal device may perform S205. If the terminal device determines that a data service is transmitted before the timer expires, after transmission of the data service ends, the terminal device may go back to perform S203, so that the terminal device can restart the timer. Therefore, the terminal device can accurately determine, based on the restarted timer, whether no data service is transmitted within the preset duration.

S205, When the timer expires, the terminal device determines whether the RRC connection is released. If the terminal device determines that the RRC connection is released, the procedure ends: or if the terminal device determines that the RRC connection is not released, S206 is performed.

Specifically, if the terminal device always has no data service to transmit before the timer expires, when the tinier expires, the terminal device may determine, based on whether an RRC connection release request sent by the base station to which the first cell belongs is received before the timer expires, whether the RRC connection between the terminal device and the base station to which the first cell belongs is released.

When the terminal device determines that the RRC connection is not released, it indicates that the configuration of the first cell is abnormal, and therefore, when the timer expires (in other words, within the preset duration), an RRC connection release procedure is still not performed between the terminal device and the base station to which the first cell belongs. In this case, no data is transmitted between the terminal device and the base station to which the first cell belongs. However, the RRC connection is still maintained between the terminal device and the base station to which the first cell belongs. To be specific, the RRC connection is still maintained between a modem of the terminal device and the base station to which the first cell belongs, and therefore the modem of the terminal needs to continuously work. This increases power consumption of the terminal device, and shortens a battery life of the terminal device. Therefore, the terminal device needs to perform a cell handover, to avoid continuously camping on the first cell with the abnormal configuration and affecting the power consumption of the terminal device.

S206. The terminal device determines whether the terminal device is currently in a screen-off state. If the terminal device is currently in a screen-off state, S207 is performed; or if the terminal device is not currently in a screen-off state, S208 is performed.

S207. The terminal device hands over from the first cell to a second cell, and records an identifier of the first cell.

Specifically, if the terminal device determines that the RRC connection is not released, the terminal device is currently in a screen-off state, indicating that a user does not use the terminal device currently. In this case, if the terminal device performs a cell handover procedure, the user is not affected. Therefore, the terminal device may directly hand over from the first cell with the abnormal configuration to the second cell. In this case, if the second cell is a cell with a normal configuration, after the terminal device hands over to the second cell, when no data is transmitted between the terminal device and a base station to which the second cell belongs, an RRC connection may be normally released between the terminal device and the base station to which the second cell belongs. This reduces the power consumption of the terminal device while ensuring user experience.

Further, when the terminal device moves to coverage areas of the first cell and the second cell again, the terminal device may determine, by using the recorded identifier of the first cell, that the configuration of the first cell is abnormal, to avoid accessing the first cell, and prevent the first cell with the abnormal configuration from affecting the power consumption of the terminal device. This further reduces the power consumption of the terminal device, and further prolongs the battery life of the terminal device.

S205. The terminal device records an identifier of the first cell.

Specifically, if the terminal device determines that the RRC connection is not released, the terminal device is currently in a screen-on state, indicating that the user currently still uses the terminal device. In this case, if the terminal device performs the cell handover procedure, unstable network experience is brought to the user. Therefore, when the terminal device is currently in a screen-on state, the terminal device may first record the identifier of the first cell with the abnormal configuration.

S209. The terminal device determines whether the terminal device enters a screen-off state from a screen-on state. If the terminal device enters a screen-off state from a screen-on state, S210 is performed; or if the terminal device does not enter a screen-off state from a screen-on state, S209 continues to be performed.

Specifically, the terminal device may detect a current status of a terminal device screen in real time or periodically, to determine whether the terminal device enters a screen-off state from a screen-on state. Optionally, the terminal device may further determine, based on whether a sleep instruction input by the user is received, whether the terminal device enters a screen-off state from a screen-on state.

S210. The terminal device determines whether an identifier of a cell on which the terminal device currently camps is the recorded identifier of the first cell. If the identifier of the cell on which the terminal device currently camps is the recorded identifier of the first cell, S211 is performed; or if the identifier of the cell on which the terminal device currently camps is not the recorded identifier of the first cell, S201 is performed.

Specifically, after determining that the terminal device enters a screen-off state from a screen-on state, the terminal device compares the identifier of the cell on which the terminal device currently camps with the recorded identifier of the first cell, to determine whether the identifier of the cell on which the terminal device currently camps is the recorded identifier of the first cell. If the identifier of the cell on which the terminal device currently camps is the recorded identifier of the first cell, it indicates that the terminal device still currently camps on the first cell with the abnormal configuration, and the terminal device may perform the cell handover procedure, namely, S211. If the identifier of the cell on which the terminal device currently camps is not the recorded identifier of the first cell, it indicates that the terminal device has moved to another cell, and the terminal device may perform the procedure again to determine whether a configuration of a current camping cell is abnormal. This prevents the cell on which the terminal device currently camps from increasing the power consumption of the terminal device.

S211. The terminal device hands over from the first cell to a second cell.

Specifically, after entering a screen-off state from a screen-on state, when determining that the cell on which the terminal device currently camps is still the first cell, the terminal device performs the cell handover procedure to hand over from the first cell to the second cell. Because the terminal device is currently in a screen-off state, it indicates that the user does not use the terminal device currently. Therefore, the terminal device performs the cell handover procedure, and the user is not affected. This reduces the power consumption of the terminal device while ensuring user experience.

Figure 3:
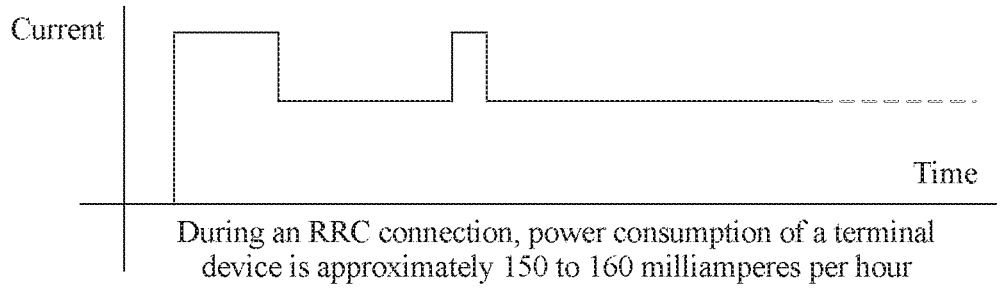
FIG. 3 is a schematic diagram 1 of power consumption of a terminal device according to an embodiment of the present invention.
Figure 4:
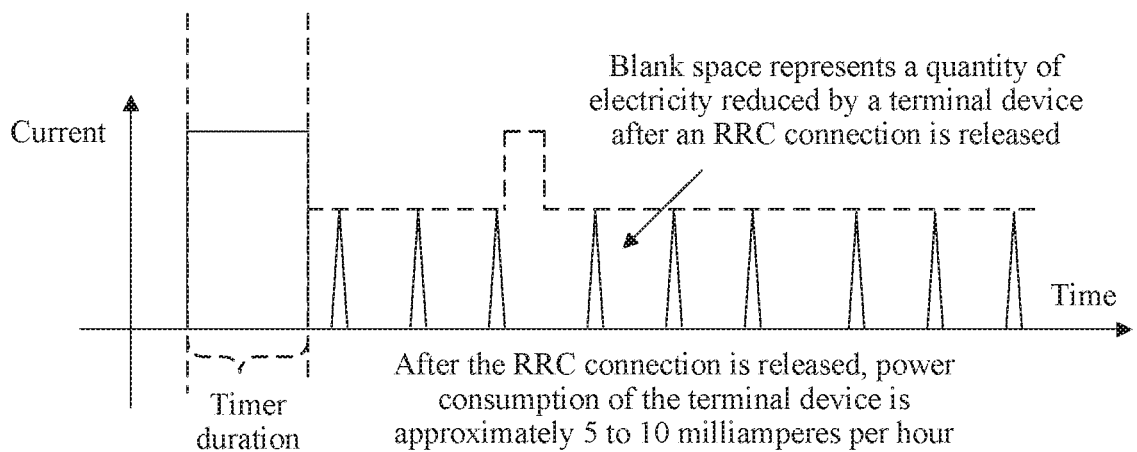
FIG. 4 is a schematic diagram 2 of power consumption of a terminal device according to an embodiment of the present invention.

FIG. 3 is a schematic diagram 1 of power consumption of a terminal device according to an embodiment of the present invention. FIG. 4 is a schematic diagram 2 of power consumption of a terminal device according to an embodiment of the present invention. As shown in FIG. 3, when no data is transmitted between the terminal device and a base station to which a first cell belongs, a quantity of electricity consumed for maintaining an RRC connection is approximately 150 to 160 milliamperes per hour. As shown in FIG. 4, after the terminal device hands over from the first cell with an abnormal configuration to a second cell with a normal configuration, after the RRC connection between the terminal device and a base station to which the second cell belongs is released when no data is transmitted, a quantity of consumed electricity is approximately 5 to 10 milliamperes per hour. To be specific, according to the cell handover method provided in this embodiment of the present invention, when the cell on which the terminal device currently camps is abnormal, after the terminal device hands over to another cell with a normal configuration, power consumption can be controlled within 10 milliamperes per hour, and power consumption of camping on the cell with the abnormal configuration is reduced by at least 100 milliamperes per hour, significantly reducing the power consumption.

According to the cell handover method provided in this embodiment of the present invention, when no data service is transmitted within preset duration, the terminal device that camps on the first cell may determine whether the RRC connection to the base station to which the first cell belongs is released. Further, when determining that the RRC connection is not released, the terminal device may determine that the configuration of the first cell is abnormal, and hand over from the first cell with the abnormal configuration to the second cell. This avoids a problem that the power consumption of the terminal device increases because the terminal device maintains the RRC connection to the base station of the first cell, reduces the power consumption of the terminal device, and prolongs a battery life of the terminal device.

It should be noted that, the foregoing example describes the cell handover method provided in this embodiment of the present invention by using the first cell with the abnormal configuration as an example. However, a person skilled in the art may understand that the cell handover method provided in this embodiment of the present invention is further applicable to the terminal device in the first cell with a normal configuration. When the terminal device has no data to transmit, the first cell with the normal configuration does not send an RRC connection release request to the terminal, and consequently the power consumption of the terminal device increases, and the battery life of the terminal device is short. In addition, when no data is transmitted, the terminal device still maintains the RRC connection to the base station to which the first cell belongs, and consequently network resource utilization is relatively low. Therefore, in the method provided in this embodiment of the present invention, after the terminal device hands over to the second cell, the power consumption of the terminal device is reduced. In addition, the terminal device that hands over to the second cell releases a radio resource occupied by the RRC connection to the base station to which the first cell belongs, so that another terminal device can use the radio resource, to improve network resource utilization of the base station to which the first cell belongs, and so on. For an implementation and an implementation principle, refer to the foregoing embodiment. Details are not described herein again.

A person of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes any medium that can store program code, such as a ROM, a RAM, a magnetic disk, or an optical disc.

Figure 5:
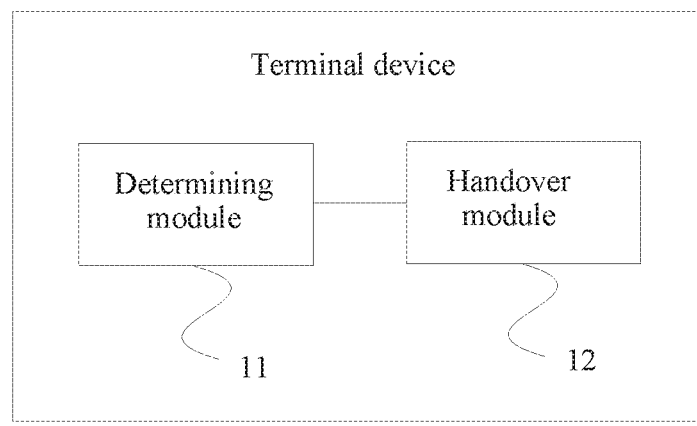
FIG. 5 is a schematic structural diagram of a terminal device according to an embodiment of the present invention.

FIG. 5 is a schematic structural diagram of a terminal device according to an embodiment of the present invention. In this embodiment, the terminal device currently camps on a first cell, and the terminal device is further currently located in a coverage area of a second cell. Referring to FIG. 5, the terminal device may include a determining module 11 and a handover module 12.

The determining module 11 is configured to: when determining that no data service is transmitted within preset duration, determine whether a radio resource control RRC connection is released.

The handover module 12 is configured to: when it is determined that the RRC connection is not released, hand over the terminal device from the first cell to the second cell.

The terminal device may be configured to perform the foregoing method embodiment. A specific implementation and a technical effect of this embodiment are similar to those of the method embodiment, and details are not described herein again.

Figure 6:
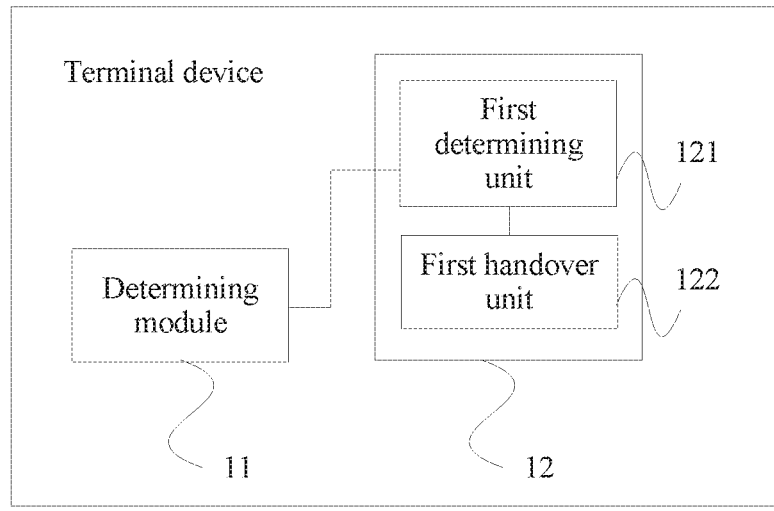
FIG. 6 is a schematic structural diagram of another terminal device according to an embodiment of the present invention.

FIG. 6 is a schematic structural diagram of another terminal device according to an embodiment of the present invention. As shown in FIG. 6, in an implementation of this embodiment of the present invention, the handover module of the terminal device may include:

a first determining unit 121, configured to determine whether e terminal device is currently in a screen-off state and a first handover unit 122, specifically configured to: when the terminal device is currently in a screen-off state, hand over the terminal device from the first cell to the second cell. Optionally, the first handover unit 122 may be specifically configured to: hand over the terminal device from the first cell to the second cell, and record an identifier of the first cell.

The terminal device may be configured to perform the foregoing method embodiment. A specific implementation and a technical effect of this embodiment are similar to those of the method embodiment, and details are not described herein again.

Figure 7:
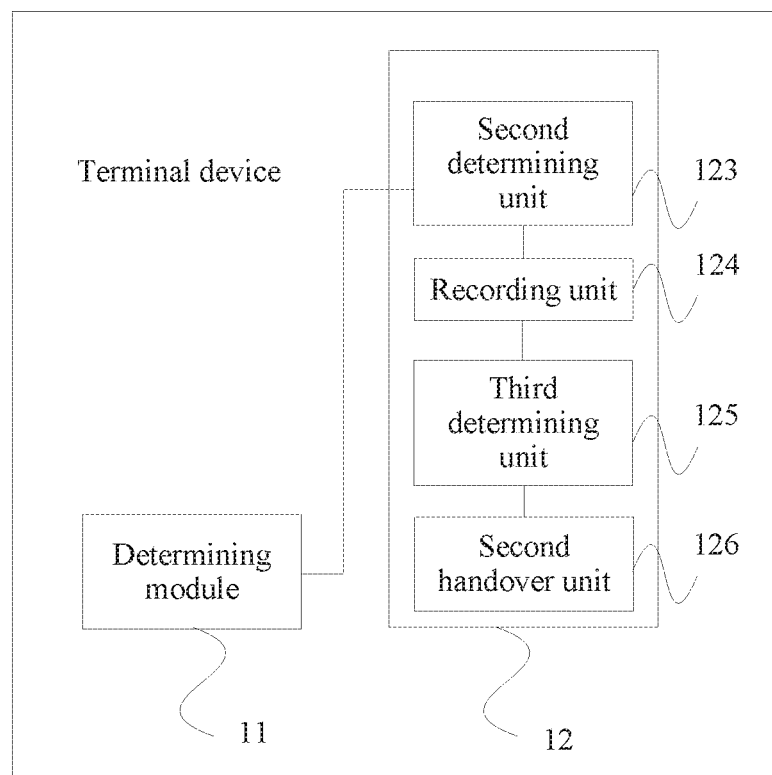
FIG. 7 is a schematic structural diagram of still another terminal device according to an embodiment of the present invention.

FIG. 7 is a schematic structural diagram of still another terminal device according to an embodiment of the present invention. As shown in FIG. 7, in an implementation of this embodiment of the present invention, the handover module of the terminal device may include:

- a second determining unit 123, configured to determine whether the terminal device is currently in a screen-off state;
- a recording unit 124, configured to: when the terminal device is currently in a screen-on state, record an identifier of the first cell;
- a third determining unit 125, configured to: when the terminal device enters a screen-off state from a screen-on state, determine whether an identifier of a cell on which the terminal device currently camps is the recorded identifier of the first cell; and
- a second handover unit 126, configured to: when the identifier of the cell on which the terminal device currently camps is the recorded identifier of the first cell, hand over the terminal device from the first cell to the second cell.

The terminal device may be configured to perform the foregoing method embodiment. A specific implementation and a technical effect of this embodiment are similar to those of the method embodiment, and details are not described herein again.

Figure 8:
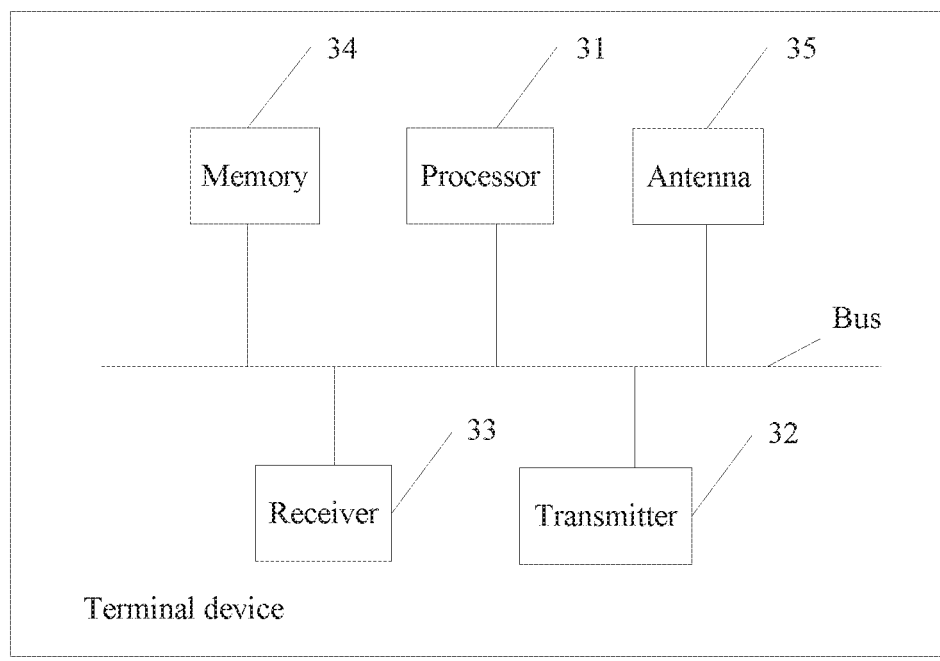
FIG. 8 is a schematic structural diagram of still another terminal device according to an embodiment of the present invention.

FIG. 8 is a schematic structural diagram of still another terminal device according to an embodiment of the present invention. As shown in FIG. 8, the terminal device includes a processor 31 and a memory 34. Optionally, the terminal device may further include a transmitter 32, a receiver 33, and an antenna 35.

The memory 34, the transmitter 32, the receiver 33, and the processor 31 may be connected by using a bus. Certainly, in actual application, the memory 34, the transmitter 32, the receiver 33, and the processor 31 may not be of a bus structure, but may be of another structure such as a star-shaped structure. This is not specifically limited in this application.

Optionally, the processor 31 may be specifically a general central processing unit or an ASIC, may be one or more integrated circuits for controlling program execution, may be a hardware circuit that is developed by using an FPGA, or may be a baseband processor.

Optionally, the processor 31 may include at least one processing core.

Optionally, the memory 34 may include one or more of a ROM, a RAM, and a magnetic disk memory. The memory 34 is configured to store data and/or an instruction that are/is required when the processor 31 runs. There may be one or more memories 34.

The processor 31 is configured to execute the instruction in the memory 34, and when the processor 31 executes the instruction stored in the memory 34, the processor 31 performs the cell handover method performed by the terminal device. Details are as follows:

The processor 31 is configured to: when determining that no data service is transmitted within preset duration, determine whether a radio resource control RRC connection is released; and when determining that the RRC connection is not released, hand over the terminal device from the first cell to the second cell.

Optionally, in an implementation of this embodiment of the present invention, the processor 31 may be configured to: determine whether the terminal device is currently in a screen-off state; and when the terminal device is currently in a screen-off state, hand over the terminal device from the first cell to the second cell. Further, the processor 31 may be configured to: hand over the terminal device from the first cell to the second cell, and record an identifier of the first cell.

Optionally, in an implementation of this embodiment of the present invention, the processor 31 may be configured to: determine whether the terminal device is currently in a screen-off state; when the terminal device is currently in a screen-on state, record an identifier of the first cell; when the terminal device enters a screen-off state from a screen-on state, determine whether an identifier of a cell on which the terminal device currently camps is the recorded identifier of the first cell; and when the identifier of the cell on which the terminal device currently camps is the recorded identifier of the first cell, hand over the terminal device from the first cell to the second cell.

The terminal device may be configured to perform the foregoing method embodiment. A specific implementation and a technical effect of this embodiment are similar to those of the method embodiment, and details are not described herein again.

Figure 9:
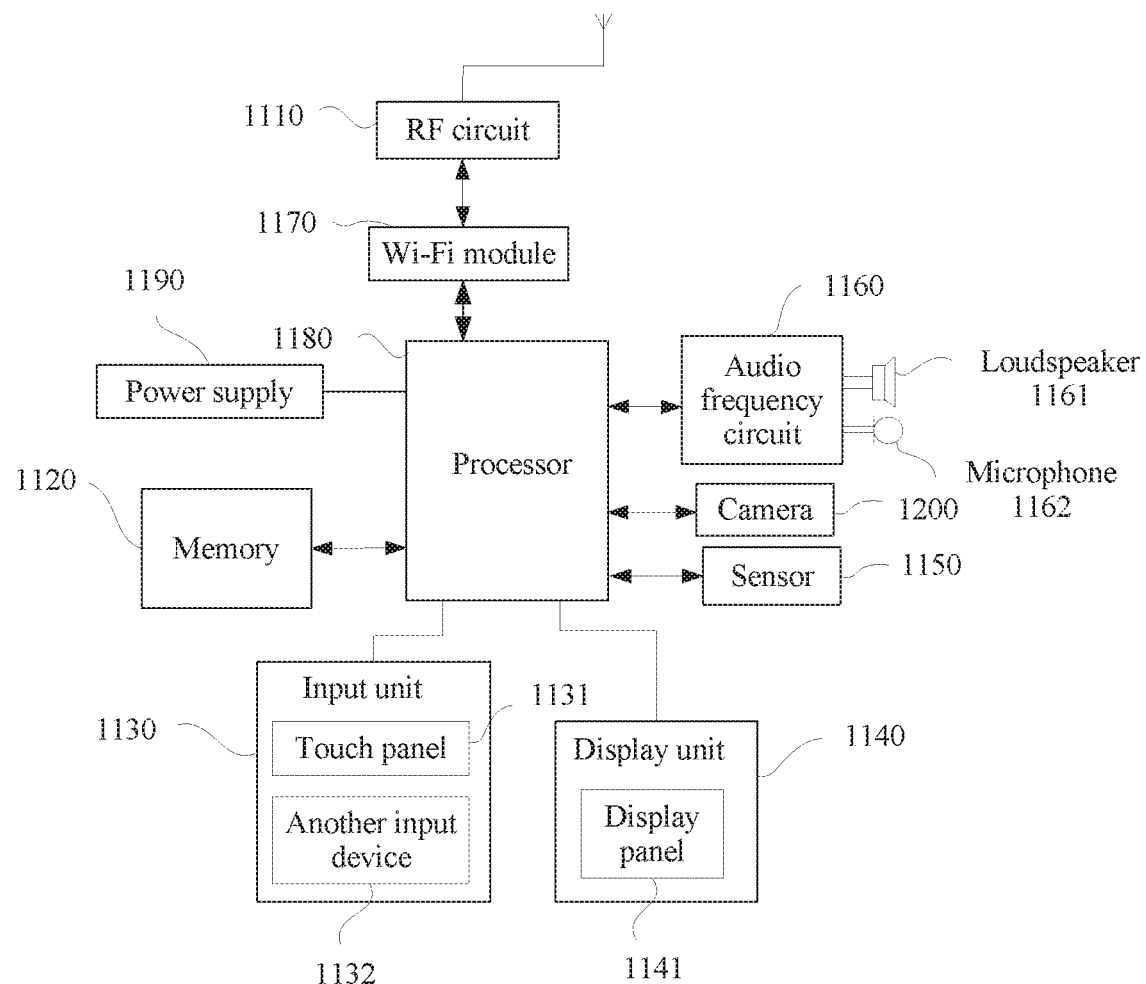
FIG. 9 is a block diagram of a partial structure when a terminal device is a mobile phone according to an embodiment of the present invention.

As described in the foregoing embodiments, the terminal device in the embodiments of the present invention may be a wireless terminal such as a mobile phone or a tablet computer. Therefore, an example in which the terminal device is the mobile phone is used. FIG. 9 is a block diagram of a partial structure when a terminal device is a mobile phone according to an embodiment of the present invention. Referring to FIG. 9, the mobile phone may include components such as a radio frequency (Radio Frequency, RF) circuit 1110, a memory 1120, an input unit 1130, a display unit 1140, a sensor 1150, an audio frequency circuit 1160, a Wireless Fidelity (wireless fidelity, Wi-Fi) module 1170, a processor 1180, and a power supply 1190. A person skilled in the art may understand that the structure of the mobile phone shown in FIG. 9 does not constitute a limitation on the mobile phone, and the mobile phone may include more or fewer components than those shown in the figure, or combine some components, or have different component arrangements.

The following describes each component of the mobile phone in detail with reference to FIG. 9.

The RF circuit 1110 may be configured to: receive and send a signal in an information receiving or sending process or in a call process; particularly, after receiving downlink information of a base station, send the downlink information to the processor 1180 for processing; and send uplink data to the base station. Generally, the RF circuit includes but is not limited to an antenna, at least one amplifier, a transceiver, a coupler, a low noise amplifier (Low Noise Amplifier, LNA), a duplexer, and the like. In addition, the RF circuit 1110 may further communicate with a network and another device through wireless communication. The wireless communication may use any communications standard or protocol, including but not limited to Global System for Mobile Communications (Global System for Mobile communications, GSM), a general packet radio service (General Packet Radio Service, GPRS), Code Division Multiple Access (Code Division Multiple Access, CDMA), Wideband Code Division Multiple Access (Wideband. Code Division Multiple Access, WCDMA), Long Term Evolution (Long Term Evolution, LTE), an e-mail, a short message service (Short Message Service, SMS), and the like.

The memory 1120 may be configured to store a software program and a module. The processor 1180 executes various functional applications of the mobile phone and data processing by running the software program and the module stored in the memory 1120. The memory 1120 may mainly include a program storage area and a data storage area. The program storage area may store an operating system, an application program required by at least one function (such as a sound play function or an image play function), and the like. The data storage area may store data (such as audio data or an address book) created based on use of the mobile phone, and the like. In addition, the memory 1120 may include a high-speed random access memory, and may further include a non-volatile memory such as at least one magnetic disk storage device, a flash memory device, or another volatile solid-state storage device.

The input unit 1130 may be configured to: receive entered digit or character information, and generate key signal input related to user setting and function control of the mobile phone. Specifically, the input unit 1130 may include a touch panel 1131 and another input device 1132. The touch panel 1131, also referred to as a touchscreen, may collect a touch operation performed by a user on or near the touch panel (for example, an operation performed by the user on or near the touch panel 1131 by using any suitable object or accessory such as a finger or a stylus), and drive a corresponding connection apparatus based on a preset program. Optionally, the touch panel 1131 may include two parts: a touch detection apparatus and a touch controller. The touch detection apparatus detects a touch position of the user, detects a signal brought by the touch operation, and transmits the signal to the touch controller. The touch controller receives touch information from the touch detection apparatus, converts the touch information into touch point coordinates, and sends the touch point coordinates to the processor 1180, and can receive and execute a command sent by the processor 1180. In addition, the touch panel 1131 may be implemented by using a plurality of types such as a resistive type, a capacitive type, an infrared ray, and a surface acoustic wave. In addition to the touch panel 1131, the input unit 1130 may include the another input device 1132. Specifically, the another input device 1132 may include but is not limited to one or more of a physical keyboard, a function key (such as a volume control key or an on/off key), a trackball, a mouse, a joystick, and the like.

The display unit 1140 may be configured to display information entered by the user or information provided for the user, and various menus of the mobile phone. The display unit 1140 may include a display panel 1141. Optionally, the display panel 1141 may be configured in a form of a liquid crystal display (Liquid Crystal Display, LCD), an organic light-emitting diode (Organic Light-Emitting Diode, OLED), or the like. Further, the touch panel 1131 may cover the display panel 1141. When detecting the touch operation on or near the touch panel 1131, the touch panel 1131 transmits the touch operation to the processor 1180 to determine a type of a touch event, and then the processor 1180 provides corresponding visual output on the display panel 1141 based on the type of the touch event. In FIG. 9, the touch panel 1131 and the display panel 1141 are used as two independent components to implement input and input functions of the mobile phone. However, in some embodiments, the touch panel 1131 and the display panel 1141 may be integrated to implement the input and output functions of the mobile phone.

The mobile phone may further include at least one type of sensor 1150, such as an optical sensor, a motion sensor, or another sensor, Specifically, the optical sensor may include an ambient optical sensor and a proximity sensor. The ambient optical sensor may adjust luminance of the display panel 1141 based on brightness of ambient light, and the optical sensor may turn off the display panel 1141 and/or backlight when the mobile phone approaches an ear. As one type of the motion sensor, an acceleration sensor may detect acceleration magnitudes in all directions (generally three axes), may detect a magnitude and a direction of gravity when the acceleration sensor is stationary, and may be configured to recognize a posture application of the mobile phone (for example, screen switching between landscape and portrait modes, a related game, or magnetometer posture calibration), a vibration recognition related function (such as a pedometer or a knock), and the like. For other sensors such as a gyroscope, a barometer, a hygrometer, a thermometer, and an infrared sensor that may be further disposed on the mobile phone, details are not described herein.

The audio frequency circuit 1160, a speaker 1161, and a microphone 1162 may provide an audio interface between the user and the mobile phone. The audio frequency circuit 1160 may receive audio data, convert the audio data into an electrical signal, and transmit the electrical signal to the loudspeaker 1161, and the loudspeaker 1161 converts the electrical signal into a sound signal for output. In addition, the microphone 1162 converts a collected sound signal into an electrical signal. The audio frequency circuit 1160 receives and converts the electrical signal into audio data, and then outputs the audio data to the processor 1180 for processing. The processor 1180 sends the audio data to, for example, another mobile phone by using the RF circuit 1110, or outputs the audio data to the memory 1120 for further processing.

Wi-Fi is a short-distance wireless transmission technology. The mobile phone may help, by using the module 1170, the user receive and send an email, browse a web page, access streaming media, and the like. The Wi-Fi module 1170 provides wireless broadband Internet access for the user. Although the Wi-Fi module 1170 is shown in FIG. 9, it may be understood that the Wi-Fi module 1170 is not a mandatory component of the mobile phone, and may be omitted as required without changing the essence of the present invention.

The processor 1180 is a control center of the mobile phone, uses various interfaces and lines to connect all parts of the entire mobile phone, and performs various functions of the mobile phone and data processing by running or executing the software program and/or the module stored in the memory 1120 and invoking data stored in the memory 1120, to perform overall monitoring on the mobile phone. Optionally, the processor 1180 may include one or more processing units. For example, an application processor and a modem processor may be integrated into the processor 1180. The application processor mainly processes an operating system, a user interface, an application program, or the like, and the modem processor mainly processes wireless communication. It may be understood that the modem processor may be not integrated into the processor 1180.

The mobile phone further includes the power supply 1190 (such as a battery) that supplies power to each component. Optionally, the power supply may be logically connected to the processor 1180 by using a power management system, to implement functions such as charging and discharging management and power consumption management by using the power management system.

The mobile phone may further include a camera 1200. The camera may be a front-facing camera or a rear-facing camera. Although not shown, the mobile phone may further include a Bluetooth module, a GPS module, and the like, and details are not described herein.

In this embodiment of the present invention, the processor 1180 included in the mobile phone may be configured to perform the foregoing cell handover method. Details are as follows:

When the mobile phone is currently in a first cell, and the mobile phone is further currently located in a coverage area of a second cell, when determining, by using the modem processor, that no data service is transmitted within preset duration, the processor 1180 included in the mobile phone may determine, by using the modem processor, whether an RRC connection is released. In specific implementation, the processor 1180 may determine, based on whether the modem processor receives a data packet within the preset duration sent by using the RF circuit 1110, or whether the modem processor sends a data packet by using the RF circuit 1110 within the preset duration, whether no data service is transmitted within the preset duration. The processor 1180 may determine, based on whether the modem processor receives, within the preset duration, an RRC connection release request sent by a base station to which the first cell belongs, whether the RRC connection is released.

When determining that the RRC connection is not released, the processor 1180 included in the mobile phone performs, by using the RF circuit 1110, an operation of handing over the mobile phone from the first cell to the second cell.

Optionally, in an implementation of this embodiment of the present invention, the processor 1180 included in the mobile phone may determine, by using the application processor, whether the mobile phone is currently in a screen-off state, and when the mobile phone is currently in a screen-off state, perform, by using the RF circuit 1110, the operation of handing over the mobile phone from the first cell to the second cell. In specific implementation, the processor 1180 may determine, based on whether the application processor receives a mobile phone screen-off event broadcast by the operating system of the mobile phone, whether the mobile phone is currently in a screen-off state. Further, the processor 1180 included in the mobile phone may be configured to: hand over the mobile phone from the first cell to the second cell, and record an identifier of the first cell.

Optionally, in an implementation of this embodiment of the present invention, the processor 1180 included in the mobile phone may determine, by using the application processor, whether the mobile phone is currently in a screen-off state; when the mobile phone is currently in a screen-on state, record an identifier of the first cell; when determining, by using the application processor, that the mobile phone enters a screen-off state from a screen-on state, determine whether an identifier of a cell on which the mobile phone currently camps is the recorded identifier of the first cell; and when the identifier of the cell on which the mobile phone currently camps is the recorded identifier of the first cell, perform, by using the RF circuit 1110, the operation of handing over the mobile phone from the first cell to the second cell.

For a technical effect of the method embodiment performed by the mobile phone, refer to the foregoing embodiment. Details are not described herein again.

What is claimed is:

1. A cell handover method comprising:
   camping, by a terminal device, on a first cell while being located within a coverage area of a second cell;
   determining, by the terminal device, that no data service is received within a preset duration;
   determining, by the terminal device, whether a radio resource control (RRC) connection is released when no data service is received within the preset duration;
   recording, by the terminal device, an identifier of the first cell;
   handover, by the terminal device, from the first cell to the second cell upon determining that the RRC connection is not released;
   determining, by the terminal device, movement out of a coverage area of the first cell and the coverage area of the second cell;
   thereafter determining, by the terminal device, movement to the coverage areas of the first cell and second cell; and
   by using the recorded identifier of the first cell, avoiding handover to the first cell and accepting handover to the second cell.

2. The method of claim 1, further comprising: determining, by the terminal device, that the terminal device is currently in a screen-off state, wherein handover, by the terminal device, from the first cell to the second cell is initiated based on the determination that the terminal device is currently in the screen-off state.

3. The method of claim 1, wherein handover, by the terminal device, from the first cell to the second cell comprises:
   determining, by the terminal device, that the terminal device is currently in a screen-on state;
   recording, by the terminal device, an identifier of the first cell based on the determination that the terminal device is currently in the screen-on state;
   determining, by the terminal device, that an identifier of a cell on which the terminal device currently camps is the identifier of the first cell when the terminal device enters a screen-off state from the screen-on state; and
   initiating, by the terminal device, the handover from the first cell to the second cell based on the determination that the identifier of the cell on which the terminal device currently camps is the identifier of the first cell.

4. The method of claim 1, wherein the first cell and the second cell are in an intra-radio access technology (RAT) communications network.

5. The method of claim 1, wherein the first cell and the second cell are in a plurality of inter-radio access technology (IRAT) communications networks.

6. The method of claim 1, wherein the method is initiated when power consumption of the terminal device increases because a configuration of the first cell on which the terminal device camps is abnormal.

7. The method of claim 6, wherein the configuration of the first cell is abnormal when a parameter related to RRC disconnection prevents a RRC connection release request from being received by the terminal device when the terminal device is not in use.

8. A terminal device comprising:
   a transmitter configured to camp on a first cell while being located within a coverage area of a second cell;
   a receiver configured to receive data service when camped on the first cell;
   a processor coupled to the transmitter and the receiver, the processor configured to:
   determine that no data service is received within a preset duration;
   determine whether a radio resource control (RRC) connection is released when no data service is received within the preset duration;
   record an identifier of the first cell;

handover the terminal device from the first cell to the second cell via the transmitter and receiver upon determining that the RRC connection is not released;

determine movement out of a coverage area of the first cell and the coverage area of the second cell;

thereafter determine movement to the coverage areas of the first cell and second cell; and by using the recorded identifier of the first cell, avoid handover to the first cell and accept handover to the second cell.

9. The terminal device of claim 8, wherein the processor is further configured to determine that the terminal device is currently in a screen-off state, wherein the handover of the terminal device from the first cell to the second cell is initiated based on the determination that the terminal device is currently in the screen-off state.

10. The terminal device of claim 8, wherein the processor is further configured to:

determine that the terminal device is currently in a screen-on state;

record an identifier of the first cell based on the determination that the terminal device is currently in a screen-on state;

determine that an identifier of a cell on which the terminal device currently camps is the identifier of the first cell when the terminal device enters a screen-off state from the screen-on state; and initiate the handover of the terminal device from the first cell to the second cell based on the determination that the identifier of the cell on which the terminal device currently camps is the identifier of the first cell.

11. The terminal device of claim 8, wherein the first cell and the second cell are in an intra-radio access technology (RAT) communications network.

12. The terminal device of claim 8, wherein the first cell and the second cell are in a plurality of in an inter-radio access technology (IRAT) communications networks.

13. The terminal device of claim 8, wherein the processor is further configured to determine when power consumption of the terminal device increases because an RRC connection is not released within a preset duration during which no data service is received.

14. A non-transitory computer readable medium comprising a computer program product for use by a terminal device, the computer program product comprising computer executable instructions stored on the non-transitory computer readable medium such that when executed by a processor cause the terminal device to:

camp on a first cell while being located within a coverage area of a second cell;

determine that no data service is received within a preset duration;

determine whether a radio resource control (RRC) connection is released when no data service is received within the preset duration;

record an identifier of the first cell;

handover from the first cell to the second cell upon determining that the RRC connection is not released;

determine movement out of a coverage area of the first cell and the coverage area of the second cell;

thereafter determine movement to the coverage areas of the first cell and second cell; and by using the recorded identifier of the first cell, avoid handover to the first cell and accept handover to the second cell.

15. The non-transitory computer readable medium of claim 14, wherein the instructions, when executed by the processor, further cause the terminal device to determine that the terminal device is currently in a screen-off state, wherein the handover from the first cell to the second cell is initiated based on the determination that the terminal device is currently in the screen-off state.

16. The non-transitory computer readable medium of claim 14, wherein the instructions, when executed by the processor, further cause the terminal device to:

determine that the terminal device is currently in a screen-on state;

record an identifier of the first cell based on the determination that the terminal device is currently in the screen-on state;

determine that an identifier of a cell on which the terminal device currently camps is the identifier of the first cell when the terminal device enters a screen-off state from the screen-on state; and initiate the handover from the first cell to the second cell based on the determination that the identifier of the cell on which the terminal device currently camps is the identifier of the first cell.

17. The non-transitory computer readable medium of claim 14, wherein the first cell and the second cell are in an intra-radio access technology (RAT) communications network.

18. The non-transitory computer readable medium of claim 14, wherein the first cell and the second cell are in a plurality of inter-radio access technology (IRAT) communications networks.

19. The non-transitory computer readable medium of claim 14, wherein the instructions further cause the terminal device to determine when power consumption of the terminal device increases because an RRC connection is not released within a preset duration during which no data service is received.

20. The non-transitory computer readable medium of claim 19, wherein the instructions further cause the terminal device to handover from the first cell to the second cell upon determining that power consumption of the terminal device increases because an RRC connection is not released within a preset duration during which no data service is received.

* * * * *